No. 850,488. PATENTED APR. 16, 1907.
J. A. POSEY.
PROTECTOR FOR RUBBER TIRES.
APPLICATION FILED DEC. 10, 1906.
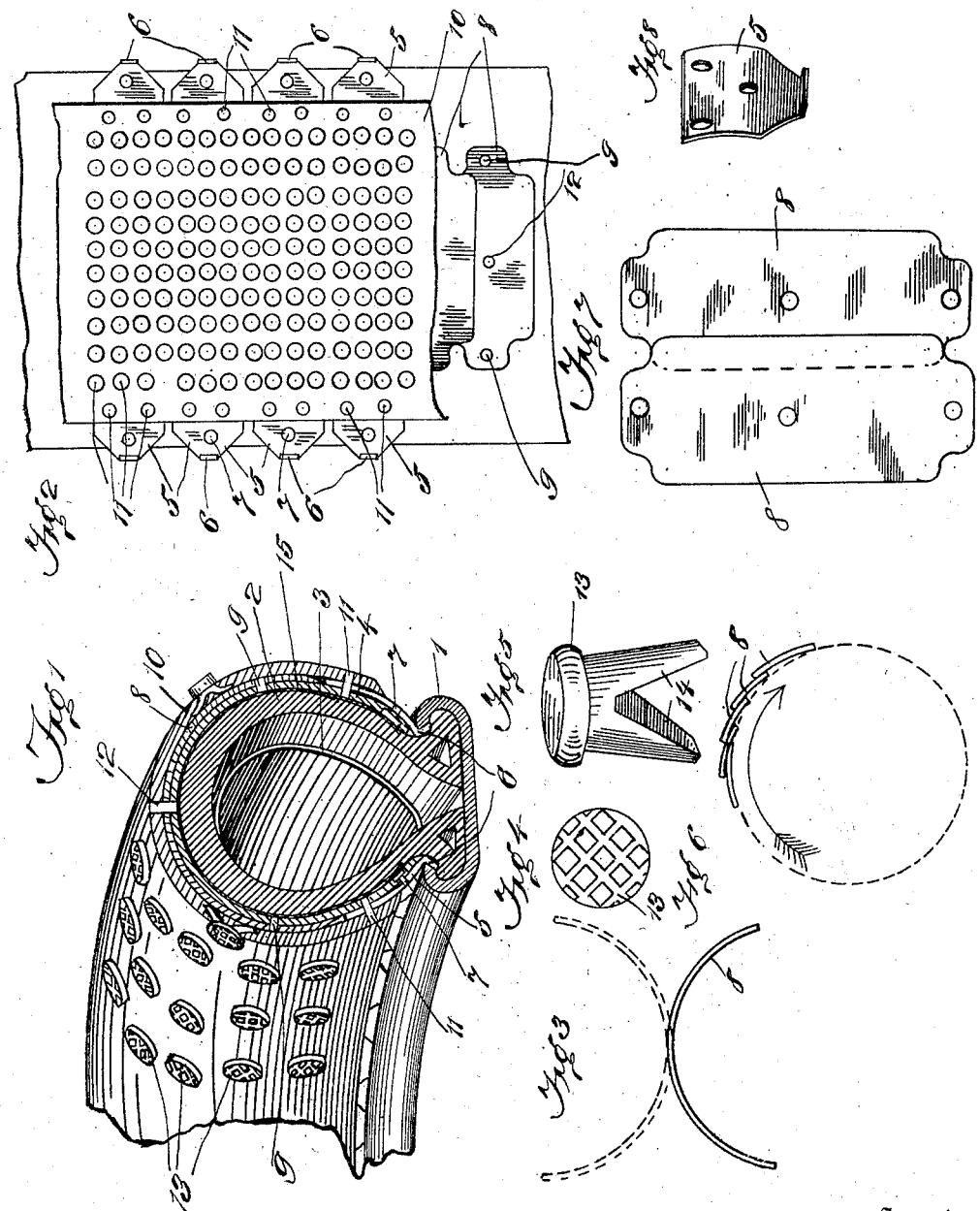
Witnesses
Inventor,
J. A. Posey,
By A. L. Jackson
Attorney,

UNITED STATES PATENT OFFICE.

JAMES A. POSEY, OF MIDLOTHIAN, TEXAS, ASSIGNOR OF ONE-THIRD TO W. W. MAJOR AND ONE-THIRD TO H. H. POSEY, OF MIDLOTHIAN, TEXAS.

PROTECTOR FOR RUBBER TIRES.

No. 850,488.     Specification of Letters Patent.     Patented April 16, 1907.

Application filed December 10, 1906. Serial No. 347,008.

*To all whom it may concern:*

Be it known that I, JAMES A. POSEY, a citizen of the United States, residing at Midlothian, county of Ellis, State of Texas, have invented certain new and useful Improvements in Protectors for Rubber Tires, of which the following is a specification.

This invention relates to protectors for rubber tires of vehicles; and the object is to provide a detachable cover for rubber or inflatable tires and to provide a flexible shield for preventing the puncturing of said cover and the tire and also to provide a tread which will aid in holding the shield in place and which will carry means for preventing the wheels from slipping or skidding.

Other objects and advantages will be fully explained in the following description, and the invention will be more particularly pointed out in the claims.

Reference is had to the accompanying drawings, which form a part of this application and specification.

Figure 1 is a cross-section of a tire in perspective. Fig. 2 is a portion of a cover and a tread and two shields lying flat, illustrating the relative positions of the cover and tread and shield. Fig. 3 is an edge view of a shield, showing in dotted outline how the curvature of the shield may be reversed. Fig. 4 is a plan view of one of the split or traction rivets. Fig. 5 is a perspective view of the same. Fig. 6 is an end view of five spring-shields, illustrating the manner of lapping the edges of the shields. Fig. 7 is a plan view of the spring-shields. Fig. 8 is a perspective view of one of the spring-clips.

Similar characters of reference are used to indicate the same parts throughout the several views.

This invention is applicable to inflatable tires of any ordinary construction.

In the drawings, 1 indicates the rim of a wheel of ordinary construction on which is mounted a tire 2 with an inner inflatable tube 3. A leather cover 4, which is canvas-lined, is placed next to the rubber tire 2, and spring-clips 5 are riveted to the cover 4. The clips 5 terminate with hooks 6, which catch under the wheel-rim 1. The clips 5 are riveted to the cover 4 by rivets 7. A shield composed of spring-metal plates 8 is riveted to the cover by rivets 9. A tread 10 is placed outside of the shields 8. The tread 10 is riveted to the cover 4 by rivets 11 and riveted to the shields 8 and to the cover 4 by rivets 12. It is thus seen that the shields 8 are attached to the cover 4 at three points, and the tread 10 is attached to the shields 8 at only one point—approximately at the middle of each shield. The tread 10 and the cover 4 are attached together near their edges and midway between the edges. The shields are flexible, and the curvature of the shields may be changed even to the reverse of their normal positions without affecting the shields or the cover or the tread, the tread not being attached to the ends of the shields. In case of a collapse of the tire the shields and the cover will not be affected and will resume their normal positions. Split rivets 13 are driven into the tread 10 to give the tread more traction power and to prevent the slipping or skidding of the wheels. The rivets 13 have prongs 14, which are beveled, so that when the rivets are driven in the tread 10 they will be clenched in the tread, as shown in Fig. 1.

The tread performs several functions in holding the shields in place and in providing a carrying means for the traction-rivets. The tread and the cover form a body for carrying and holding in place the puncture-resisting shields. A sheet of canvas 15 lines the cover 4. This canvas prevents heat between the leather and the rubber and will also prevent the rivets from injuring the tire. The canvas is glued to the leather and chalked on the side next to the tire to prevent the canvas from affecting the rubber. The canvas is porous and will permit sufficient ventilation to prevent the rubber tire and the leather from clinging together as if vulcanized.

Having fully described my invention, what I claim as new, and desire to secure by Letters Patent, is—

1. A tire-protector comprising a cover provided with clips riveted thereto and terminating with hooks for engaging the rim of a wheel, puncture-resisting shields consisting of flexible spring-metal plates arranged transversely of said cover and riveted thereto and lapping on each other in series, a tread covering said shields and riveted to said cover below the ends of said shields and riveted to said cover through substantially the middle part of each shield.

2. A tire-protector comprising a cover provided with clips riveted thereto and terminating with hooks for engaging the wheel-rim, a series of puncture-resisting shields consisting of flexible metal plates arranged transversely of said cover and riveted thereto and lapping on each other, a tread covering said shields and riveted to said cover and said clips below the ends of said plates and binding said cover and clips together and riveted to said cover substantially through the middle of each shield.

3. A tire-protector comprising a canvas-lined cover provided with clips riveted thereto and terminating with hooks engaging the wheel-rim, a series of puncture-resisting shields consisting of flexible spring-metal plates arranged transversely of said cover and riveted thereto and lapping on each other, a tread covering said shields and riveted to said cover below the ends of said shields and binding said clips and cover together and riveted to said cover substantially through the middle of each shield.

4. A tire-protector comprising a canvas-lined cover provided with clips riveted thereto and terminating with hooks engaging the wheel-rim, a series of puncture-resisting shields consisting of reversible spring-metal plates arranged transversely of said cover and riveted thereto and lapping on each other, a tread binding said cover and shields in operative relation, and split traction-rivets clenched in said tread.

5. A tire-protector comprising a canvas-lined cover coextensive with the exposed portion of the tire and provided with spring-clips riveted thereto and terminating with hooks for engaging the wheel-rim, a reversibly-flexible metal shield attached to the exterior of said cover, and a tread substantially coextensive with said cover and attached to said cover and said clips beyond the edges of said shield and permitting freedom of movement of the edges of said shield relative to said tread, and split traction-rivets clenched and carried in said tread.

In testimony whereof I set my hand, in the presence of two witnesses, this 4th day of December, 1906.

JAMES A. POSEY.

Witnesses:
  A. L. JACKSON,
  B. J. FORDOWSKI.